US012426738B2

(12) United States Patent
Yeom

(10) Patent No.: US 12,426,738 B2
(45) Date of Patent: Sep. 30, 2025

(54) COVER ASSEMBLY FOR COOKING APPARATUS

(71) Applicant: CUCHEN CO., LTD, Seoul (KR)

(72) Inventor: Kyu Hyun Yeom, Chungcheongnam-do (KR)

(73) Assignee: CUCHEN CO., LTD., Seoul (KR)

(*) Notice: Subject to any disclaimer, the term of this patent is extended or adjusted under 35 U.S.C. 154(b) by 0 days.

(21) Appl. No.: 18/712,706

(22) PCT Filed: Jun. 28, 2022

(86) PCT No.: PCT/KR2022/009216
§ 371 (c)(1),
(2) Date: May 23, 2024

(87) PCT Pub. No.: WO2023/106527
PCT Pub. Date: Jun. 15, 2023

(65) Prior Publication Data
US 2025/0017416 A1 Jan. 16, 2025

(30) Foreign Application Priority Data
Dec. 6, 2021 (KR) .................. 10-2021-0172886
Dec. 6, 2021 (KR) .................. 10-2021-0172887

(51) Int. Cl.
A47J 36/10 (2006.01)
A47J 27/08 (2006.01)

(52) U.S. Cl.
CPC .......... *A47J 36/10* (2013.01); *A47J 27/0813* (2013.01)

(58) Field of Classification Search
CPC ............ A47J 27/0804; A47J 27/0806; A47J 27/0808; A47J 27/0811; A47J 27/0813;
(Continued)

(56) References Cited
U.S. PATENT DOCUMENTS 2,600,714 A * 6/1952 Wenscott ............ A47J 27/0806
277/648
5,641,085 A * 6/1997 Lonbardo ................ A47J 27/09
220/240
(Continued)

FOREIGN PATENT DOCUMENTS

CN 2334306 Y 8/1999
CN 111358287 A * 7/2020 .............. A47J 36/00
(Continued)

OTHER PUBLICATIONS

Japan Patent Office, Office Action issued in Japanese application No. 2024-532568, Mar. 18, 2025.
(Continued)

Primary Examiner — Javier A Pagan
(74) Attorney, Agent, or Firm — Nicholas Park

(57) ABSTRACT

The present invention provides a cover assembly for a cooking apparatus configured to seal a gap between an inner pot accommodated in a main body of the cooking apparatus and a top plate of a main body lid of the cooking apparatus, wherein the cover assembly includes: a cover plate; and a packing coupled to and extending along a circumference of the cover plate, wherein the packing includes: a central body; an upper close contact protrusion extending inward from the central body to be inclined upward and configured to make close contact with the top plate; a lower close contact protrusion extending inward from the central body to be inclined downward and configured to make close contact with the inner pot; an upper air groove provided in an upper surface of the central body; and a lower air groove provided in a lower surface of the central body.

4 Claims, 8 Drawing Sheets

(58) Field of Classification Search
CPC ... A47J 27/08; A47J 36/10; A47J 36/064; A47J 36/062; A47J 36/06
USPC ........................................................ 220/304
See application file for complete search history.

(56) References Cited

U.S. PATENT DOCUMENTS

| | | | |
|---|---|---|---|
| 6,695,319 B1* | 2/2004 | Anota | A47J 27/09 220/203.11 |
| 10,993,573 B2* | 5/2021 | Julien | A47J 27/0806 |
| 2011/0011274 A1* | 1/2011 | Thelen | A47J 27/09 99/337 |

FOREIGN PATENT DOCUMENTS

| | | |
|---|---|---|
| JP | 1983-046915 A | 3/1983 |
| JP | 2013-515530 A | 5/2013 |
| JP | 2015-171586 A | 10/2015 |
| KR | 10-2001-0072476 A | 7/2001 |
| KR | 20-2020-0001924 U | 9/2020 |

OTHER PUBLICATIONS

KIPO, Office Action issued in Korean application No. 10-2021-0172886, Nov. 28, 2023.
KIPO, Office Action issued in Korean application No. 10-2021-0172886, Mar. 12, 2024.
KIPO, Office Action issued in Korean application No. 10-2021-0172887, Nov. 13, 2023.
WIPO, International Search Report for International Application No. PCT/KR2022/009216, Mar. 6, 2023.

\* cited by examiner

COVER ASSEMBLY FOR COOKING APPARATUS

CROSS-REFERENCE TO RELATED APPLICATION

This application is the National Phase of PCT International Application No. PCT/KR2022/009216, filed Jun. 28, 2022, which claims the benefit of Korean Application No. 10-2021-0172886, filed Dec. 6, 2021, and Korean Application No. 10-2021-0172887, filed Dec. 6, 2021, which is hereby incorporated by reference herein in their entirety.

TECHNICAL FIELD

The present disclosure relates to a cover assembly for a cooking apparatus and to a cooking apparatus.

BACKGROUND

In general, as a typical example of a cooking apparatus, an electric pressure rice cooker is an apparatus capable of selectively performing a cooking function for cooking rice and a warming function for maintaining cooked rice at a constant temperature. In the electric pressure rice cooker, a main body lid, in which a steam discharge hole is formed, may be installed on a top of a main body so as to be openable/closable, an inner pot may be detachably built in an inside of the main body, and an inner pot lid may be separately provided so as to cover the inner pot. The inside of the main body is provided with an induction heating type heater or heating plate type heater which transfers heat to cooking ingredients accommodated in the inner pot, that is, rice, mixed grains, or other food ingredients, so that the cooking ingredients can be cooked.

Since the electric pressure rice cooker cooks the cooking ingredients under a high pressure, the electric pressure rice cooker includes a cover assembly sealing the space in the inner pot to maintain the high pressure of the inner pot. In the cover assembly of a typical electric pressure rice cooker, a packing is fitted to a circumference of a circular disk-shaped cover member. The packing is prone to deform due to exposure to high-temperature and high-pressure steam, an external force applied during a user's attaching and detaching process, and the like. Thus, there is a problem that sealing performance of the packing deteriorates due to the deformation of the packing.

SUMMARY

The object to be solved by the technical idea of the present invention is to provide a cover assembly for a cooking apparatus having improved sealing performance and improved cooking quality, and to provide a cooking apparatus including the same.

A cover assembly for a cooking apparatus according to one embodiment of the present disclosure is configured to seal a gap between an inner pot accommodated in a main body of the cooking apparatus and a top plate of a main body lid of the cooking apparatus. The cover assembly for a cooking apparatus includes: a cover plate; and a ring-shaped packing coupled to a circumference of the cover plate and extending along the circumference of the cover plate. The packing includes: a central body including a fastening groove into which the cover plate is fitted; an upper close contact protrusion extending inward from the central body to be inclined upward and configured to make close contact with the top plate; a lower close contact protrusion extending inward from the central body to be inclined downward and configured to make close contact with the inner pot; at least one upper air groove provided in an upper surface of the central body; and at least one lower air groove provided in a lower surface of the central body.

In exemplary embodiments, the packing may further include a connection groove extending from one end portion of the at least one upper air groove up to one end portion of the at least one lower air groove.

In exemplary embodiments, the at least one upper air groove may include a plurality of upper air grooves spaced apart from each other along a circumference of the packing, and the at least one lower air groove may include a plurality of lower air grooves spaced apart from each other along the circumference of the packing.

In exemplary embodiments, the packing may further include: a plurality of upper auxiliary grooves provided in the upper surface of the central body and provided between two upper air grooves neighboring in a circumferential direction of the packing among the plurality of upper air grooves; and a plurality of lower auxiliary grooves provided in the lower surface of the central body and provided between two lower air grooves neighboring in the circumferential direction of the packing among the plurality of lower air grooves. A depth of each of the plurality of upper auxiliary grooves may be smaller than a depth of each of the plurality of upper air grooves, and a depth of each of the plurality of lower auxiliary grooves may be smaller than a depth of each of the plurality of lower air grooves.

In exemplary embodiments, the packing may have a structure that is symmetrical up and down with respect to a plane passing through a center of the packing.

In exemplary embodiments, the cover assembly for a cooking apparatus may further include a handle mounted in a central portion of the cover plate, and the handle may include an insertion groove into which a fixing post of the main body lid is inserted.

A cooking apparatus according to one embodiment of the present disclosure includes: a main body; an inner pot accommodated in the main body; a main body lid coupled to the main body and including a top plate covering the inner pot and a fixing post protruding downward from the top plate; and a cover assembly separably fastened to the main body lid. The cover assembly includes: a cover plate covering the inner pot; a packing coupled to a circumference of the cover plate, having a ring shape extending along the circumference of the cover plate, and configured to be disposed between the inner pot and the top plate to seal a gap between the inner pot and the top plate; and a handle provided in a central portion of the cover plate and including an insertion groove into which the fixing post is inserted. The packing includes: a ring-shaped central body including a fastening groove into which the cover plate is fitted, and extending along the circumference of the cover plate; an upper close contact protrusion extending inward from the central body to be inclined upward, having a ring shape extending along the central body, and being in continuous contact with the top plate; a lower close contact protrusion extending inward from the central body to be inclined downward, having a ring shape extending along the central body, and being in continuous contact with the inner pot; at least one upper air groove provided in an upper surface of the central body; and at least one lower air groove provided in a lower surface of the central body.

In exemplary embodiments, the at least one upper air groove may linearly extend from one end portion spaced apart from a contact portion between the upper close contact protrusion and the top plate up to an outward surface of the central body, and the at least one lower air groove may linearly extend from one end portion spaced apart from a contact portion between the lower close contact protrusion and the inner pot up to the outward surface of the central body.

In exemplary embodiments, the at least one upper air groove may cause a first space between the upper surface of the central body and the top plate to communicate with an external space located outside the inner pot. The at least one lower air groove may cause a second space between the lower surface of the central body and the inner pot to communicate with the external space located outside the inner pot.

In exemplary embodiments, the at least one upper air groove may include a plurality of upper air grooves spaced apart from each other along the circumference of the packing, and the at least one lower air groove may include a plurality of lower air grooves spaced apart from each other along the circumference of the packing.

In exemplary embodiments, the packing may further include: a plurality of upper auxiliary grooves provided in the upper surface of the central body and provided between two upper air grooves neighboring in a circumferential direction of the packing among the plurality of upper air grooves; and a plurality of lower auxiliary grooves provided in the lower surface of the central body and provided between two lower air grooves neighboring in the circumferential direction of the packing among the plurality of lower air grooves. A depth of each of the plurality of upper auxiliary grooves may be smaller than a depth of each of the plurality of upper air grooves, and a depth of each of the plurality of lower auxiliary grooves may be smaller than a depth of each of the plurality of lower air grooves.

In exemplary embodiments, the top plate may be configured to be moved between a raised position spaced apart from the inner pot by a first distance and a lowered position spaced apart from the inner pot by a second distance smaller than the first distance. The cover assembly may be configured to be moved together with the top plate when the top plate is moved, and may further include a spring configured to elastically support the top plate and the packing in a direction from the raised position of the top plate toward the lowered position of the top plate.

According to exemplary embodiments of the present invention, the cover assembly is separably fastened to the main body lid of the cooking apparatus, and the packing of the cover assembly prevents a vacuum from being formed in a space between the packing and the top plate and in a space between the packing and the inner pot. Thus, an excessive external force can be prevented from being applied to the packing in the process of separating the packing from the main body lid and/or the inner pot. Therefore, the deformation and wear of the packing is prevented, the sealing performance of the packing can be improved, and, ultimately, the cooking quality of the cooking apparatus can be improved.

DETAILED DESCRIPTION

Figure 1:
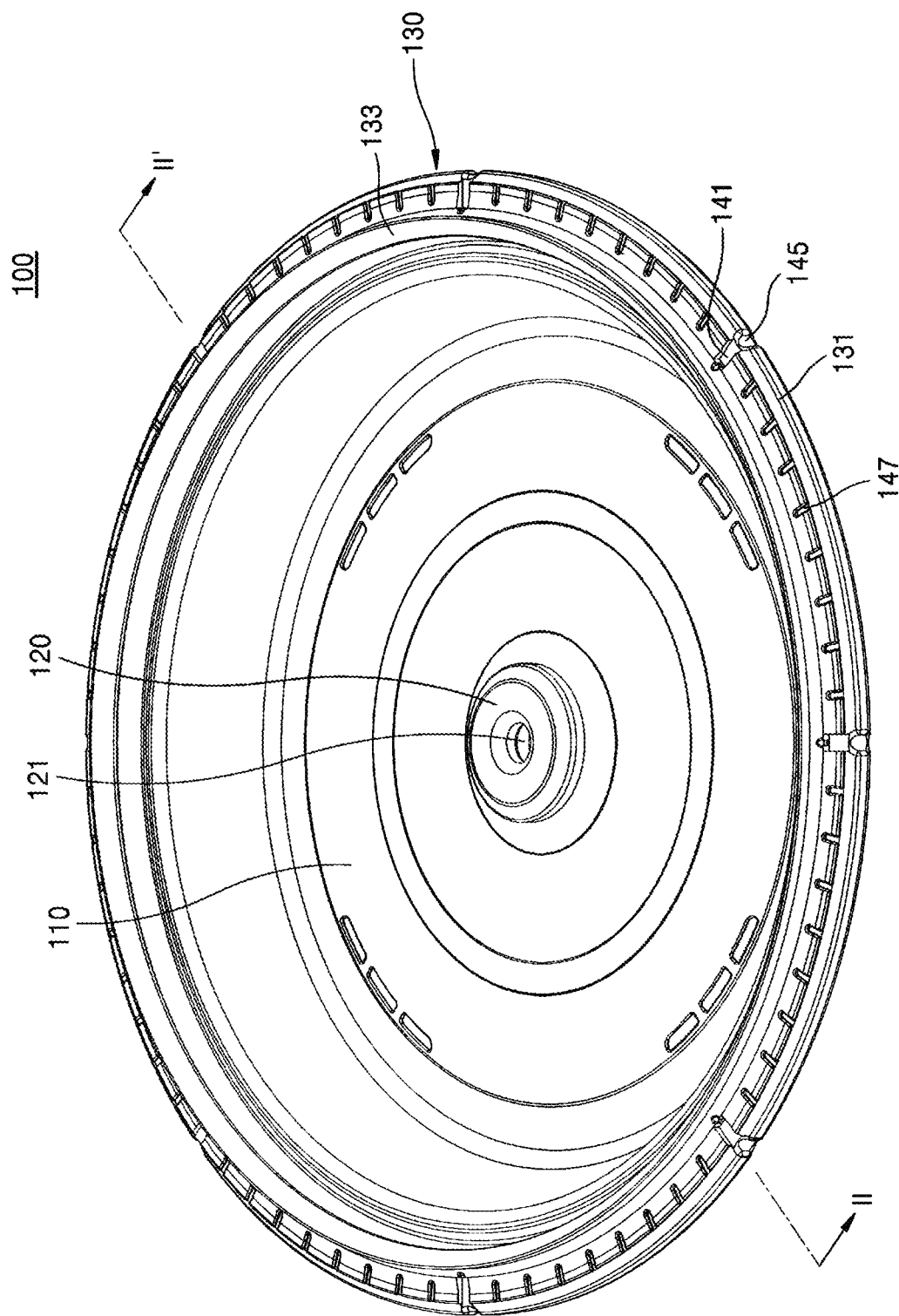
FIG. 1 a perspective view showing a cover assembly for a cooking apparatus according to exemplary embodiments of the present invention.

Hereinafter, preferred embodiments of the present invention are described in detail with reference to the accompanying drawings. However, the embodiments of the present invention may be modified in many different forms, and the scope of the present invention should not be construed as being limited due to the embodiments to be described in detail below. The embodiments of the present invention should be construed as being provided to more completely explain the present invention to those of ordinarily skill in the art. Like reference numerals indicate like elements throughout the specification and drawings. Furthermore, various elements and regions are schematically depicted in the drawings. Therefore, the concepts of the present invention are not limited by the relative size or spacing depicted in the accompanying drawings.

Unless otherwise defined, all terms used herein, including technical terms and scientific terms, have the same meaning as those commonly understood by one of ordinary skill in the technical field to which the concepts of the present invention pertain. Further, it is to be understood that the terms that are commonly used and defined in dictionaries should be construed as having the meaning consistent with what the terms mean in the context of the relevant description, and should not be construed as having an excessively formal meaning unless explicitly defined herein.

Figure 2:
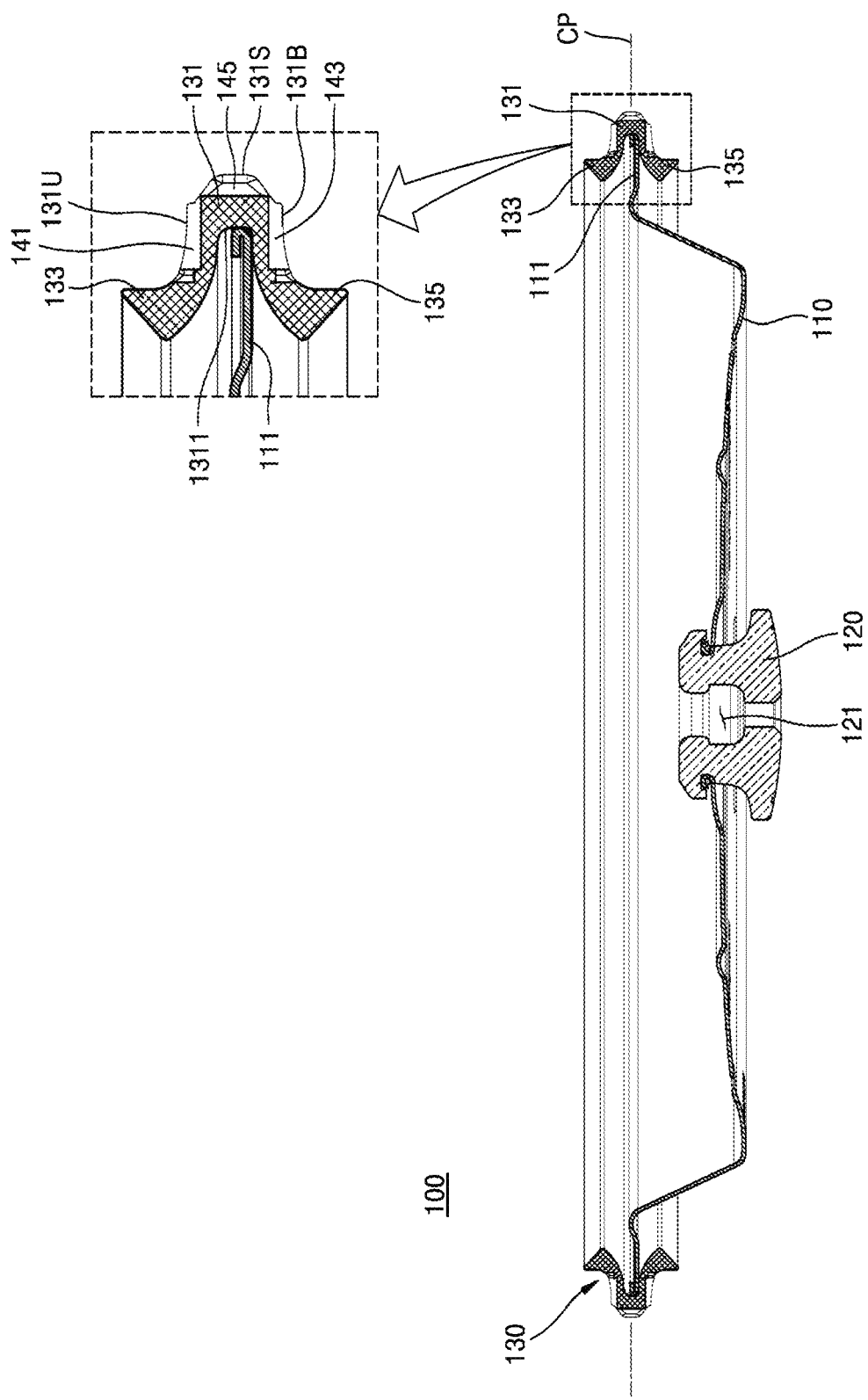
FIG. 2 is a cross-sectional view of a cover assembly taken along line II-II' of FIG. 1.
Figure 3:
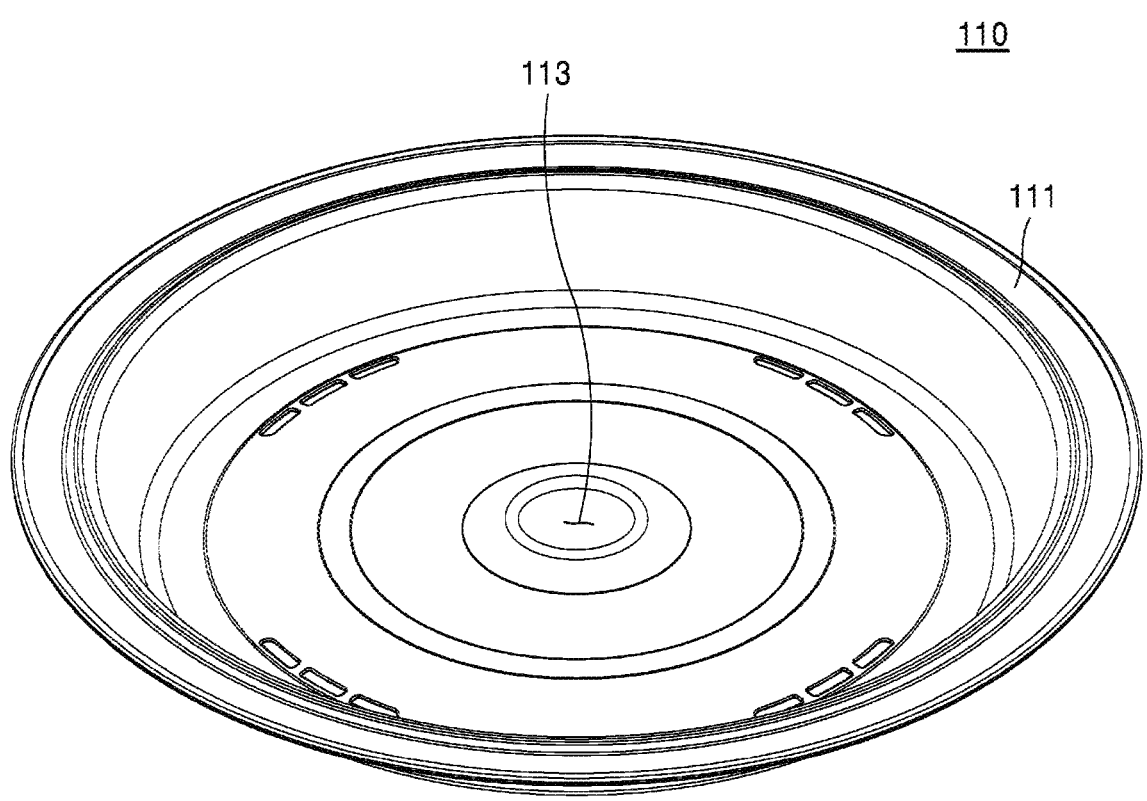
FIG. 3 is a perspective view showing a cover plate of a cover assembly.
Figure 4:
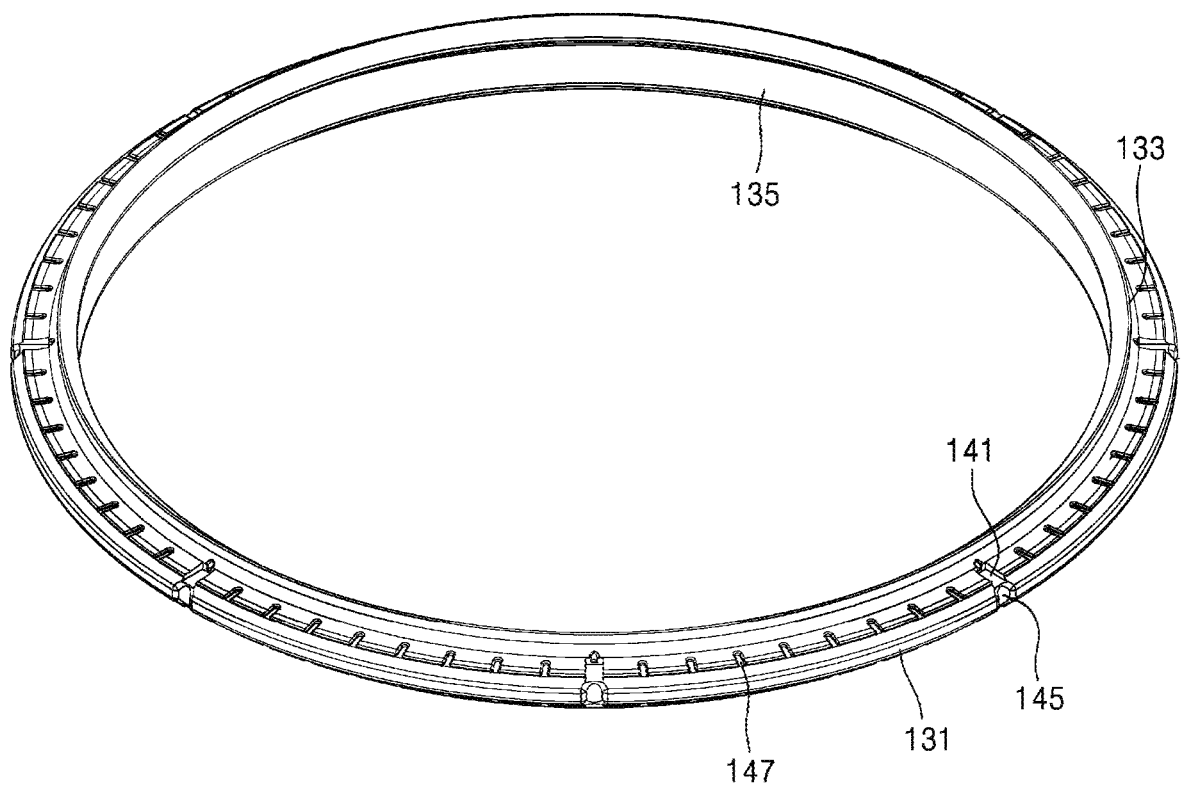
FIG. 4 is a perspective view showing a packing of a cover assembly.
Figure 5:
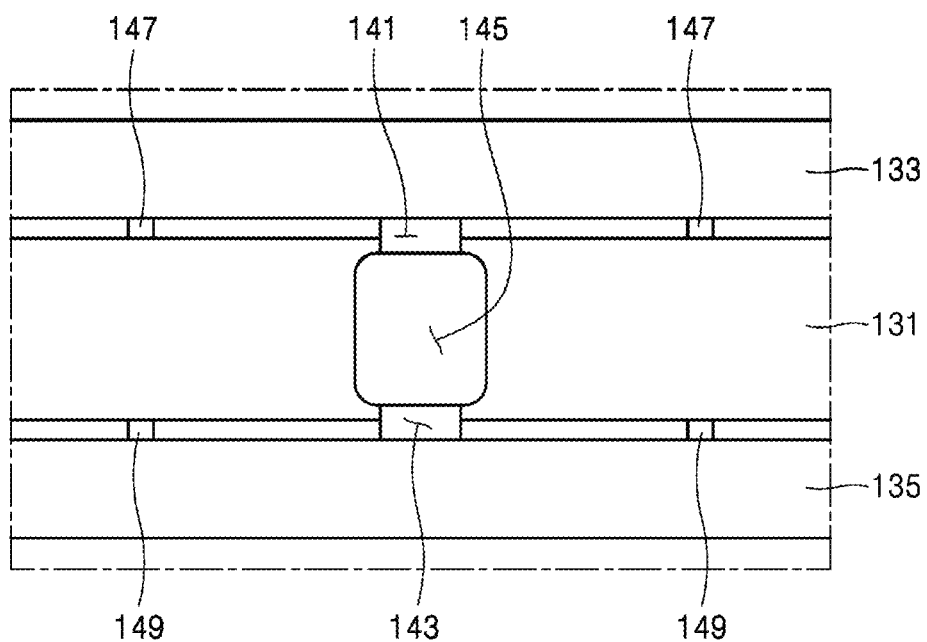
FIG. 5 is a side view showing a packing of a cover assembly.

FIG. 1 is a perspective view showing a cover assembly 100 for a cooking apparatus according to exemplary embodiments of the present invention. FIG. 2 is a cross-sectional view of the cover assembly 100 taken along line II-II' of FIG. 1. FIG. 3 is a perspective view showing a cover plate 110 of the cover assembly 100. FIG. 4 is a perspective view showing a packing 130 of the cover assembly 100. FIG. 5 is a side view showing the packing 130 of the cover assembly 100.

Referring to FIGS. 1 to 5, the cover assembly 100 may be provided to a cooking apparatus (10 in FIG. 6) so as to block a leakage of high-temperature and high-pressure steam generated during a cooking process using the cooking apparatus 10. The cover assembly 100 may be separably fastened to a main body lid (200 in FIG. 6) of the cooking apparatus 10. The cover assembly 100 may be configured to be fastened to the main body lid 200 of the cooking apparatus 10 to seal a gap between an inner pot (310 in FIG. 6) accommodated in a main body (300 in FIG. 6) of the cooking apparatus 10 and a top plate (220 in FIG. 6) of the main body lid 200 of the cooking apparatus 10.

The cover assembly 100 may include the cover plate 110, a handle 120, and the packing 130.

The cover plate 110 may have a shape and a size suitable for covering the inner pot 310. The cover plate 110 may approximately have a circular disk shape in a plan view. The cover plate 110 allows the steam generated during the cooking process to form on the cover plate 110, thereby protecting the top plate 220 and various electrical components mounted on the top plate 220 from the steam generated during the cooking process. The cover plate 110 may include a material such as stainless steel that is lightweight and strong enough not to bend easily, but is not limited thereto.

The handle 120 may be fastened to a central portion of the cover plate 110. For example, the handle 120 may be separably fastened to a fastening hole 113 provided in the central portion of the cover plate 110. For example, a groove formed in an outer peripheral surface of the handle 120 fits with a body portion of the cover plate 110 defining the fastening hole 113 in the cover plate 110, thereby realizing fastening between the handle 120 and the cover plate 110. An upper portion of the handle 120 may protrude upward from the cover plate 110, and a lower portion of the handle 120 may protrude downward from the cover plate 110.

The handle 120 may include an insertion groove 121 into which a fixing post 281 provided in the main body lid 200 can be fitted. For example, the fixing post 281 is in the form of a post extending downward from a bottom of the top plate 220. The insertion groove 121 of the handle 120 extends downward from a top surface of the handle 120, and may have a size and a shape suitable for fitting the fixing post 281 thereinto. The cover assembly 100 may be coupled to the main body lid 200 by fitting the fixing post 281 into the insertion groove 121 of the handle 120. Further, by separating the fixing post 281 from the insertion groove 121 of the handle 120, the cover assembly 100 may be separated from the main body lid 200. To separate the cover assembly 100 from the main body lid 200, a user may separate the cover plate 110 from the main body lid 200 by holding the lower portion of the handle 120 protruding from the bottom of the cover plate 110 and applying an external force acting downward.

The handle 120 may include an elastically deformable material. For example, the handle 120 may include a material such as silicone rubber or synthetic rubber, but is not limited thereto.

The packing 130 may be separably fastened to a circumference of the cover plate 110. The packing 130 may have a ring shape continuously extending along the circumference of the cover plate 110, and may make continuous contact with the circumference of the cover plate 110. In exemplary embodiments, the cover plate 110 may have a flat plate shape in which an outer rim portion 111 thereof extends in a direction away from a center of the cover plate 110 or in a radial direction, and a fastening groove 1311 accommodating the outer rim portion 111 of the cover plate 110 may be provided in an inward surface of the packing 130. The fastening groove 1311 of the packing 130 may extend continuously along the circumference of the cover plate 110. The outer rim portion 111 of the cover plate 110 is fitted into the fastening groove 1311 provided in the inward surface of the packing 130, thereby realizing fastening between the cover plate 110 and the packing 130.

For example, the packing 130 may include an elastically deformable material. For example, the packing 130 may include a material such as silicone rubber or synthetic rubber, but is not limited thereto.

The packing 130 may include a central body 131, an upper close contact protrusion 133, and a lower close contact protrusion 135.

The central body 131 of the packing 130 is a portion making contact with the cover plate 110, and may have a ring shape continuously extending along the circumference of the cover plate 110 in a plan view. The fastening groove 1311, into which the outer rim portion 111 of the cover plate 110 is inserted and fixed, may be provided in an inward surface of the central body 131. The central body 131 may include an upper portion extending on an upper surface of the outer rim portion 111 of the cover plate 110, a lower portion extending under a lower surface of the outer rim portion 111 of the cover plate 110, and a side portion interconnecting the upper portion and the lower portion.

The upper close contact protrusion 133 may extend inward from the central body 131 (i.e., in a direction toward a center of the packing 130 or a center of the cover plate 110) to be inclined upward, and the lower close contact protrusion 135 may extend inward from the central body 131 (i.e., in the direction toward the center of the packing 130 or the center of the cover plate 110) to be inclined downward. The upper close contact protrusion 133 may overlap with the outer rim portion 111 of the cover plate 110 in a vertical direction, and may be located on the upper surface of the outer rim portion 111 of the cover plate 110. The lower close contact protrusion 135 may overlap with the outer rim portion 111 of the cover plate 110 in the vertical direction, and may be located under the lower surface of the outer rim portion 111 of the cover plate 110.

The packing 130 may have an up-and-down symmetrical structure. That is, the packing 130 may have a structure that is symmetrical up and down with respect to a central plane CP passing through the center of the packing 130 in the vertical direction or in a height direction of the packing 130 (e.g., a mirror symmetrical shape symmetrical with respect to the central plane CP passing through the center of the packing 130 in the vertical direction or in the height direction). In this case, since the packing 130 does not have an up-and-down directivity, assembly of the packing 130 and the cover plate 110 can be further facilitated.

The upper close contact protrusion 133 may have a shape that is bent upward or protrudes upward from an end portion of the central body 131. The upper close contact protrusion 133 has a ring shape that extends continuously along the ring-shaped central body 131 or the circumference of the cover plate 110 in a plan view, and may be configured to make continuous contact with the top plate 220 along an extension direction of the upper close contact portion. When the cover assembly 100 is mounted on the cooking apparatus 10, an external force acting downward from a contact surface between the upper close contact protrusion 133 and the top plate 220 is applied to the upper close contact protrusion 133 of the packing 130 and, therefore, the upper portion of the packing 130 (i.e., a portion of the packing 130 located on the outer rim portion 111 of the cover plate 110) can be elastically deformed. Due to an elastic restoring force of the elastically deformed packing 130, the upper close contact protrusion 133 can be in close contact with the top plate 220. The upper close contact protrusion 133 in close contact with the top plate 220 can prevent a gap from being formed between the top plate 220 and the packing 130, and can block the steam generated during the cooking process using the cooking apparatus 10 from leaking between the top plate 220 and the packing 130.

The lower close contact protrusion 135 may have a shape that is bent downward or protrudes downward from an end portion of the central body 131. The lower close contact protrusion 135 has a ring shape that extends continuously along the ring-shaped central body 131 or the circumference of the cover plate 110 in a plan view, and may be configured to make continuous contact with the inner pot 310 along an extension direction of the lower close contact portion. When the cover assembly 100 is mounted on the cooking apparatus 10, an external force acting upward from a contact surface between the lower close contact protrusion 135 and the inner pot 310 is applied to the lower close contact protrusion 135 of the packing 130 and, therefore, the lower portion of the packing 130 (i.e., a portion of the packing 130 located under the outer rim portion 111 of the cover plate 110) can be elastically deformed. Due to the elastic restoring force of the elastically deformed packing 130, the lower close contact protrusion 135 can be in close contact with the inner pot 310. The lower close contact protrusion 135 in close contact with the inner pot 310 can prevent a gap from being formed between the inner pot 310 and the packing 130, and can block the steam generated during the cooking process using the cooking apparatus 10 from leaking between the inner pot 310 and the packing 130.

The packing 130 may include at least one upper air groove 141 provided in an upper surface 131U of the central body 131 (i.e., a surface facing the top plate 220). The at least one upper air groove 141 may generally extend in a direction away from the center of the cover plate 110 or in the radial direction, and may extend generally linearly. The upper air groove 141 is not formed in the upper close contact protrusion 133, which is in continuous contact with the top plate 220 to form a continuous sealed section between the packing 130 and the top plate 220. For example, the upper air groove 141 may linearly extend from one end portion spaced apart from a contact portion between the upper close contact protrusion 133 and the top plate 220 up to an outward surface 131S of the central body 131.

For example, the packing 130 may include one upper air groove 141 or may include a plurality of upper air grooves 141 spaced apart from each other along a circumferential direction of the packing 130. When the packing 130 includes the plurality of upper air grooves 141, the plurality of upper air grooves 141 may have a uniform and constant interval. That is, each distance between two neighboring upper air grooves 141 in the circumferential direction may be constant.

The packing 130 may include at least one lower air groove 143 provided in a lower surface 131L of the central body 131 (i.e., a surface facing the inner pot 310). The at least one lower air groove 143 may generally extend in the direction away from the center of the cover plate 110 or in the radial direction, and may extend generally linearly. The lower air groove 143 is not formed in the lower close contact protrusion 135, which is in continuous contact with the inner pot 310 to form a continuous sealed section between the packing 130 and the inner pot 310. For example, the lower air groove 143 may linearly extend from one end portion spaced apart from a contact portion between the lower close contact protrusion 135 and the inner pot 310 up to the outward surface 131S of the central body 131.

For example, the packing 130 may include one lower air groove 143 or may include a plurality of lower air grooves 143 spaced apart from each other along the circumferential direction of the packing 130. When the packing 130 includes the plurality of lower air grooves 143, the plurality of lower air grooves 143 may have a uniform and constant interval. That is, each distance in the circumferential direction between two neighboring lower air grooves 143 may be constant.

The packing 130 may further include a connection groove 145 extending from one end portion of the upper air groove 141 provided in the upper surface 131U of the central body 131 to one end portion of the lower air groove 143 provided in the lower surface 131L of the central body 131. The connection groove 145 may be provided in the outward surface 131S of the central body 131, and may extend generally in the vertical direction to interconnect the upper air groove 141 and the lower air groove 143. Since the upper air groove 141 and the lower air groove 143 are connected to each other via the connection groove 145, the packing 130 may be formed with a groove, which starts from a point of the lower portion of the packing 130 adjacent to the lower close contact protrusion 135 and continuously extends up to a point of the upper portion of the packing 130 adjacent to the upper close contact protrusion 133.

The packing 130 may include at least one upper auxiliary groove 147 provided in the upper surface 131U of the central body 131 (i.e., the surface facing the top plate 220). The at least one upper auxiliary groove 147 may generally extend in the direction away from the center of the cover plate 110 or in the radial direction, and may extend generally linearly. The upper auxiliary groove 147 is not formed in the upper close contact protrusion 133, which is in continuous contact with the top plate 220 to form a continuous sealed section between the packing 130 and the top plate 220. For example, the upper auxiliary groove 147 may extend toward the outward surface 131S of the central body 131, from a point spaced apart from the upper close contact protrusion 133 by a predetermined distance or from a boundary between the central body 131 and the upper close contact protrusion 133.

For example, the packing 130 may include one upper auxiliary groove 147 or may include a plurality of upper auxiliary grooves 147 spaced apart from each other along the circumferential direction of the packing 130. For example, a plurality of upper auxiliary grooves 147 may be provided between two upper air grooves 141 neighboring in the circumferential direction of the packing 130.

A depth of the upper auxiliary groove 147 may be smaller than a depth of the upper air groove 141. Further, a horizontal width (i.e., a width along the circumferential direction of the packing 130) and an extension length (i.e., a length extending in the radial direction of the packing 130 or in the direction away from the center of the packing 130) of the upper auxiliary groove 147 may be smaller than a horizontal width and an extension length of the upper air groove 141, respectively.

The packing 130 may include at least one lower auxiliary groove 149 provided in the lower surface 131L of the central body 131 (i.e., the surface facing the inner pot 310). The at least one lower auxiliary groove 149 may generally extend in the direction away from the center of the cover plate 110 or in the radial direction, and may extend generally linearly. The lower auxiliary groove 149 is not formed in the lower close contact protrusion 135, which is in continuous contact with the inner pot 310 to form a continuous sealed section between the packing 130 and the inner pot 310. For example, the lower auxiliary groove 149 may extend toward the outward surface 131S of the central body 131, from a point spaced apart from the lower close contact protrusion 135 by a predetermined distance or from a boundary between the central body 131 and the lower close contact protrusion 135.

For example, the packing 130 may include one lower auxiliary groove 149 or may include a plurality of lower auxiliary grooves 149 spaced apart from each other along the circumferential direction of the packing 130. For example, a plurality of lower auxiliary grooves 149 may be provided between two lower air grooves 143 neighboring in the circumferential direction of the packing 130.

A depth of the lower auxiliary groove 149 may be smaller than a depth of the lower air groove 143. Further, a horizontal width (i.e., a width along the circumferential direction of the packing 130) and an extension length (i.e., a length extending in the radial direction of the packing 130 or in the direction away from the center of the packing 130) of the lower auxiliary groove 149 may be smaller than a horizontal width and an extension length of the lower air groove 143, respectively.

Unlike the upper air groove 141 and the lower air groove 143 interconnected via the connection groove 145, the upper auxiliary groove 147 and the lower auxiliary groove 149 may not be connected to each other.

When the packing 130 has the up-and-down symmetrical structure, the number and arrangement of the upper air grooves 141 (e.g., the interval between the neighboring upper air grooves 141) may be the same as the number and arrangement of the lower air grooves 143, and the number and arrangement of the upper auxiliary grooves 147 may be the same as the number and arrangement of the lower auxiliary grooves 149.

Figure 6:
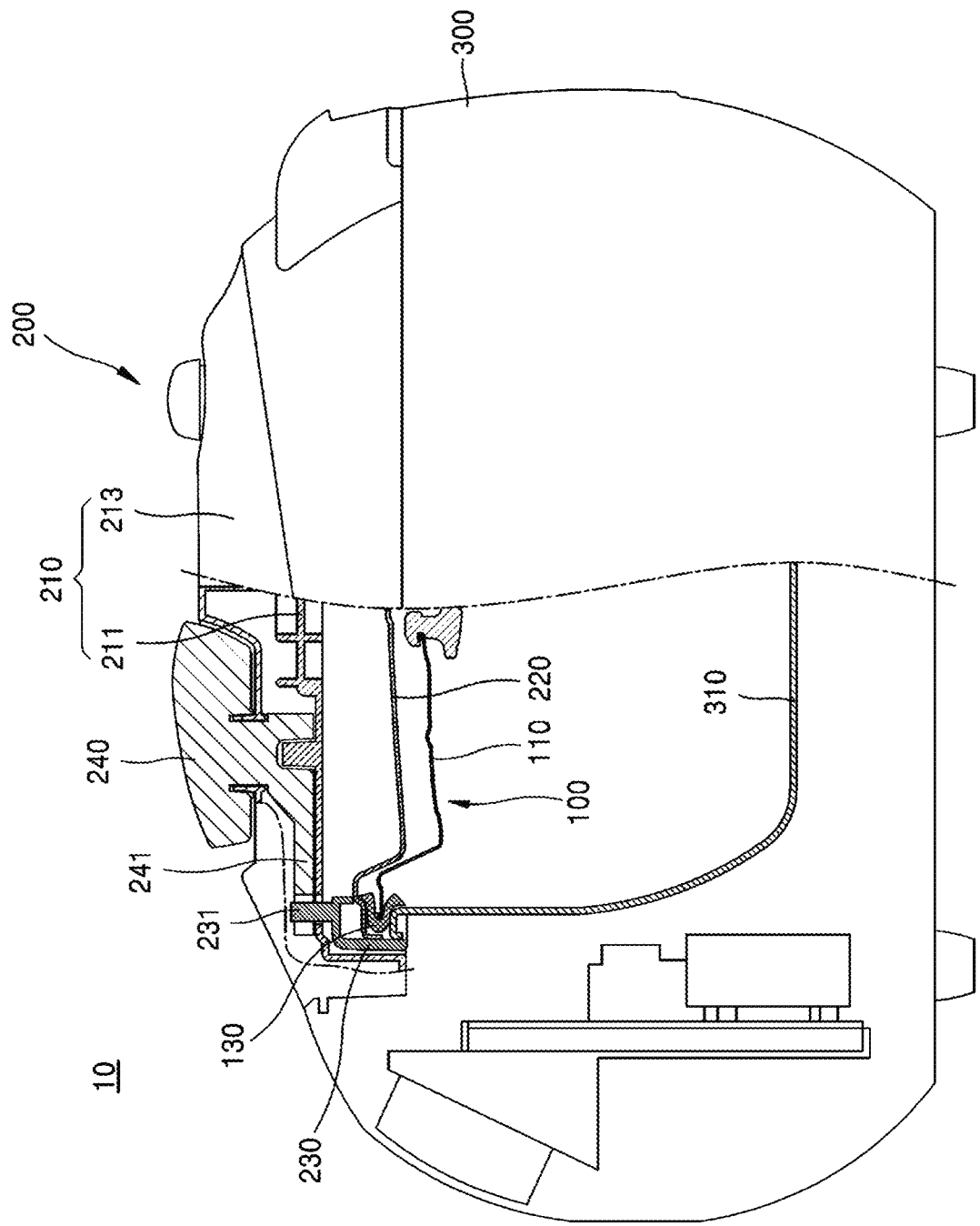
FIG. 6 is a configuration view showing a cooking apparatus according to exemplary embodiments of the present invention.
Figure 7:
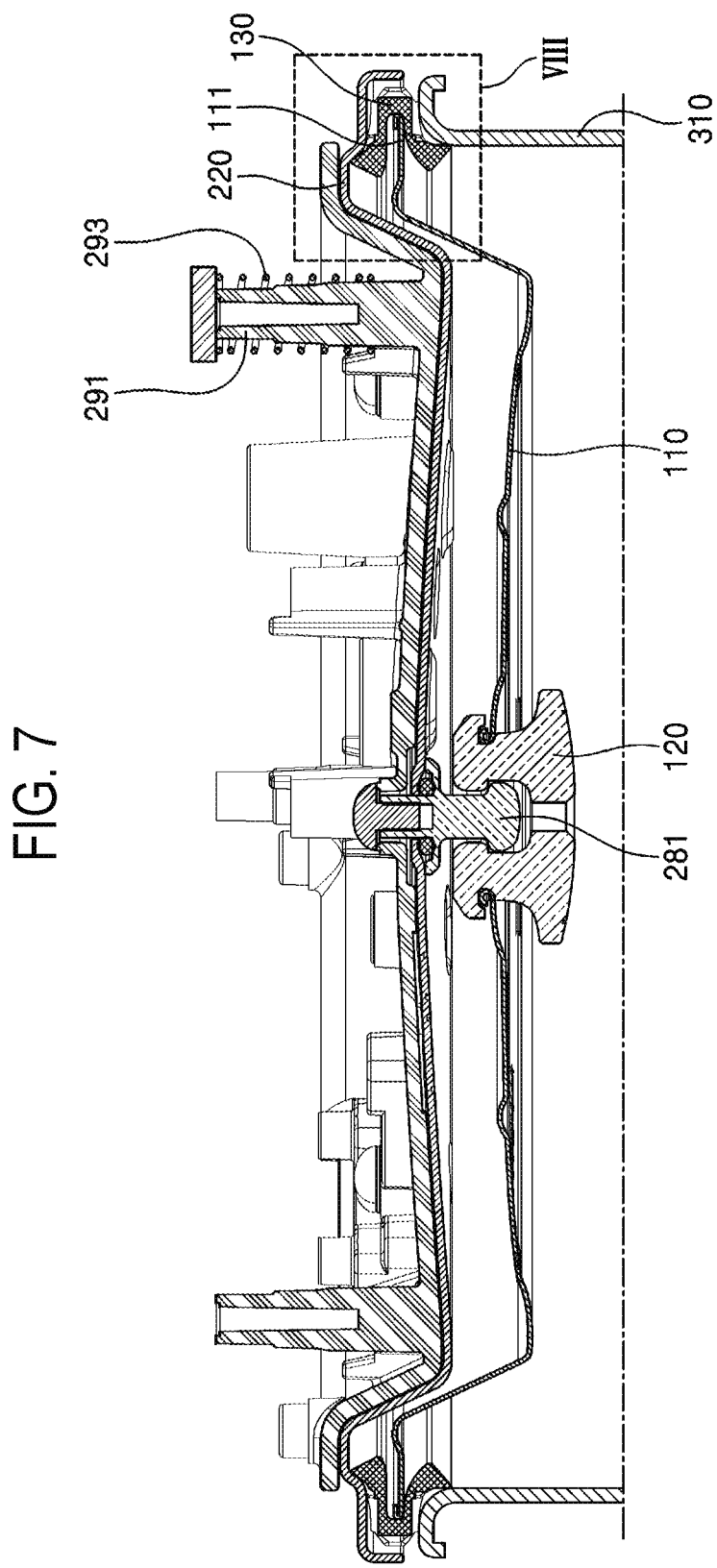
FIG. 7 is a cross-sectional view showing a portion of a cooking apparatus.
Figure 8:
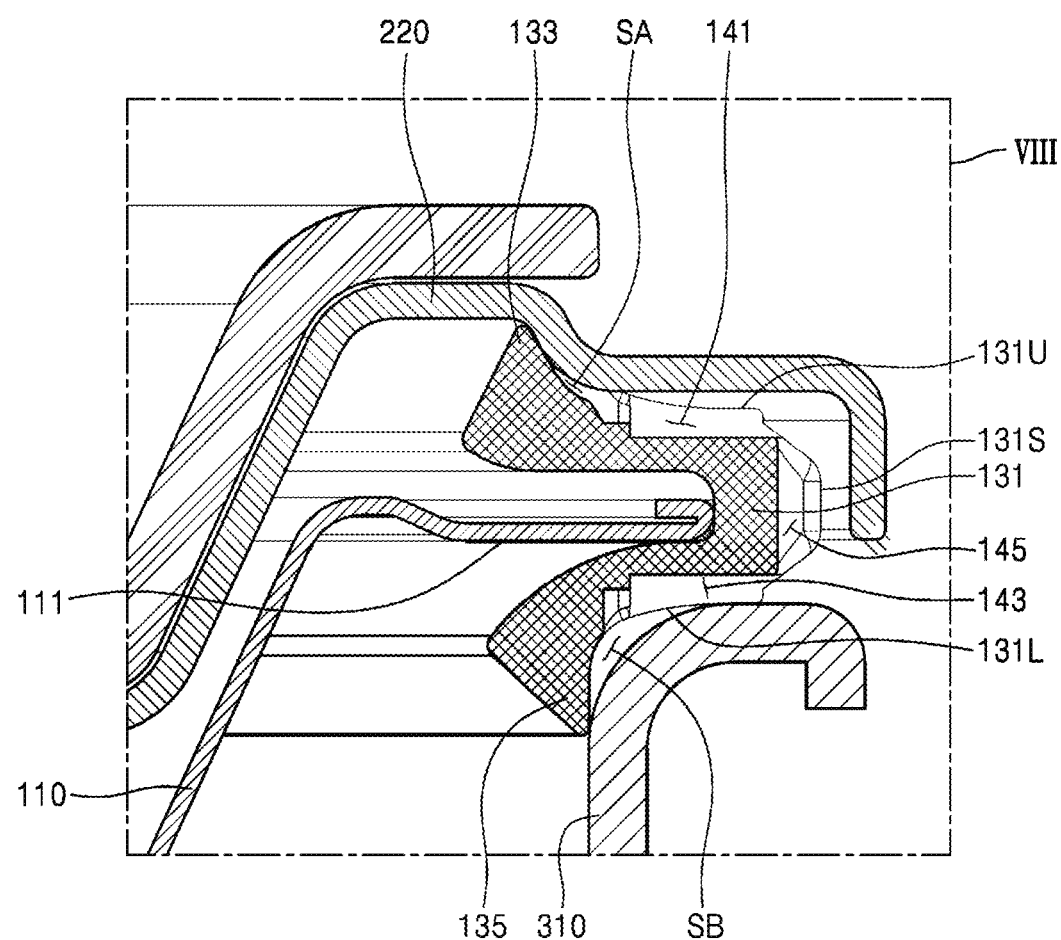
FIG. 8 is an enlarged view showing an area indicated by "VIII" in FIG. 7.

FIG. 6 is a configuration view showing a cooking apparatus 10 according to exemplary embodiments of the present invention. FIG. 7 is a cross-sectional view showing a portion of the cooking apparatus 10. FIG. 8 is an enlarged view showing an area indicated by "VIII" in FIG. 7.

Referring to FIGS. 6 to 8 together with FIGS. 1 to 5, the cooking apparatus 10 may include the main body 300 including a cooking space in which cooking ingredients can be cooked, the inner pot 310 accommodated in the cooking space of the main body 300, the main body lid 200 installed on the main body 300 so as to open and close the cooking space of the main body 300, and the cover assembly 100 separably mounted on the main body lid 200. The cover assembly 100 may correspond to the cover assembly 100 described with reference to FIGS. 1 to 5.

The inner pot 310 may include, at an upper end thereof, a plurality of flange portions protruding outward in the radial direction. The plurality of flange portions may be spaced apart from each other at a predetermined interval along a circumference of the inner pot 310. The main body 300 may include a heating source for heating the food accommodated in the inner pot 310, for example, a heating plate type heater or an induction heating type heater.

The main body lid 200 may seal the cooking space of the main body 300 such that an appropriate pressure is formed in the cooking space while cooking of cooking ingredients is in progress. For example, the main body lid 200 may be configured to be detachably coupled to the main body 300 to open and close the cooking space. In exemplary embodiments, the main body lid 200 may be hingedly coupled to an upper portion of the main body 300 to rotate about a rotation shaft, and may open or close the cooking space of the main body 300 by rotating about the rotation shaft.

The main body lid 200 may include a frame 210, the top plate 220, a locking ring 230, and a locking handle 240.

The frame 210 is coupled to the main body 300, and may include a lower frame 211 and an upper frame 213 covering the lower frame 211. Various electrical components may be installed in the lower frame 211, and the locking handle 240 connected to the locking ring 230 may be installed in the upper frame 213.

The top plate 220 may be coupled to a lower portion of the lower frame 211. A predetermined exhaust assembly, which is configured to discharge steam in the cooking space of the main body 300 while cooking of cooking ingredients is in progress or after cooking is completed, may be installed in the top plate 220. The exhaust assembly may perform a function of preventing the pressure in the cooking space of the main body 300 from increasing excessively by discharging the steam in the cooking space of the main body 300 and/or a function of maintaining the pressure in the cooking space at a pressure suitable for cooking. For example, the exhaust assembly may include a solenoid valve and/or a poise valve.

The top plate 220 may be installed in the main body lid 200 so as to be movable within a predetermined range in the vertical direction (e.g., a direction perpendicular to a reference surface on which the cooking apparatus is placed). For example, the top plate 220 may be configured to be moved within a predetermined range in the vertical direction depending on the steam pressure in the inner pot 310. For example, the top plate 220 may be configured to be moved between a raised position spaced apart from the inner pot 310 in the vertical direction by a first distance and a lowered position spaced apart from the inner pot 310 in the vertical direction by a second distance smaller than the first distance. The raised position of the top plate 220 may be a position where the steam pressure in the inner pot 310 is a relatively high pressure, and the lowered position of the top plate 220 may be a position where the steam pressure in the inner pot 310 is a relatively low pressure. For example, when the steam pressure in the inner pot 310 changes from the low pressure to the high pressure, the top plate 220 may be moved upward (i.e., in a direction from the lowered position of the top plate 220 toward the raised position of the top plate), and when the steam pressure in the inner pot 310 changes from the high pressure to the low pressure, the top plate 220 may be moved downward (i.e., in a direction from the raised position of the top plate 220 toward the lowered position of the top plate).

The locking ring 230 may be rotatably mounted on the top plate 220. For example, the locking ring 230 may be a wheel-shaped member configured to rotate around a predetermined shaft. The locking ring 230 may be switched between a locked position where the locking ring is locked to the flange portion of the inner pot 310 and an unlocked position where the locking ring is unlocked from the flange portion of the inner pot 310.

The locking ring 230 may be configured to rotate in conjunction with an operation of the locking handle 240. More specifically, the locking ring 230 and the locking handle 240 may be connected to each other via a locking lever 241, one end of the locking lever 241 may be connected to a lower portion of the locking handle 240, and the opposite end of the locking lever 241 may be connected to a connection post 231 of the locking ring 230. The locking lever 241 may be configured to rotate about an axis, which is one end of the locking lever 241 connected to the locking handle 240.

The cover assembly 100 may be separably fastened to the main body lid 200. The fixing post 281 protruding downward from the top plate 220 is inserted into the insertion groove 121 of the handle 120, thereby fastening the cover assembly 100 to the main body lid 200. When the cover assembly 100 is fastened to the main body lid 200, the cover assembly 100 may be moved together with the top plate 220 when the top plate 220 is moved. When the cover assembly 100 is fastened to the main body lid 200, the packing 130 of the cover assembly 100 is disposed between the top plate 220 and the inner pot 310, and blocks the steam from leaking through the gap between the top plate 220 and the inner pot 310. For example, the packing 130 of the cover assembly 100 may be configured to be compressed between the top plate 220 and the inner pot 310 to block the steam from leaking through the gap between the top plate 220 and the inner pot 310.

While cooking is in progress in the cooking apparatus 10, when the upper close contact protrusion 133 is in close contact with the top plate 220, a first space SA surrounded by the upper portion of the packing 130 and the top plate 220 may be formed near the contact portion between the upper close contact protrusion 133 and the top plate 220. The first space SA may include a space between the upper surface 131U of the central body 131 and the top plate 220. The upper air groove 141 provided in the surface of the packing 130 facing the top plate 220 causes the first space SA to communicate with an external space located outside the packing 130 or outside the inner pot 310, and can allow the flow of air between the first space SA and the external space located outside the packing 130 or outside the inner pot 310.

As a comparative example, when the packing 130 does not have the upper air groove 141, a vacuum may be formed in the first space SA while cooking is in progress in the cooking apparatus 10. In such a case, the packing 130 may be strongly attached to the top plate 220, thereby increasing a force required to separate the packing 130 and the top plate 220 from each other after cooking is completed. Further, the packing 130 may be deformed and worn by the force applied to the packing 130 for the separation of the packing 130 and the top plate 220. Due to such deformation and wear of the packing 130, sealing performance of the packing 130 may deteriorate.

Further, while cooking is in progress in the cooking apparatus 10, when the lower close contact protrusion 135 is in close contact with the inner pot 310, a second space SB surrounded by the lower portion of the packing 130 and the inner pot 310 may be formed. The second space SB may include a space between the lower surface 131L of the central body 131 and the inner pot 310. The lower air groove 143 provided in the surface of the packing 130 facing the inner pot 310 causes the second space SB to communicate with the external space located outside the packing 130 or outside the inner pot 310, and can allow the flow of air between the second space SB and the external space located outside the packing 130 or outside the inner pot 310.

As a comparative example, when the packing 130 does not have the lower air groove 143, a vacuum may be formed in the second space SB while cooking is in progress in the cooking apparatus 10. In such a case, the packing 130 is strongly attached to the inner pot 310, thereby increasing a force required to separate the packing 130 and the inner pot 310 when opening the main body lid 200. Further, the packing 130 may be deformed and worn by the force applied to the packing 130 for the separation of the packing 130 and the inner pot 310. Due to such deformation and wear of the packing 130, the sealing performance of the packing 130 may deteriorate.

However, in the embodiments of the present invention, while cooking is in progress in the cooking apparatus 10, the upper air groove 141 allows the flow of air between the first space SA and the external space located outside the packing 130, and the lower air groove 143 allows the flow of air between the second space SB and the external space located outside the packing 130. Thus, it is possible to prevent a vacuum from being formed in the first space SA and/or the second space SB. Accordingly, the deformation and wear of the packing 130, which may be caused due to the vacuum formed in the first space SA and/or the second space SB, can be prevented.

Further, in the embodiments of the present invention, the upper auxiliary groove 147 provided in the surface of the packing 130 facing the top plate 220 can function to further suppress the forming of the vacuum between the upper portion of the packing 130 and the top plate 220 together with the upper air groove 141, and the lower auxiliary groove 149 provided in the surface of the packing 130 facing the inner pot 310 can function to further suppress the forming of the vacuum between the lower portion of the packing 130 and the inner pot 310 together with the lower air groove 143.

In exemplary embodiments, the cooking apparatus 10 may include a spring 293 provided on the top plate 220 and configured to provide a downward elastic restoring force. The spring 293 is mounted, for example, on a support post 291 provided on the top plate 220, and can provide an elastic restoring force pressing the top plate 220 downward. That is, the spring 293 may be configured to elastically support the top plate 220 in the direction from the raised position of the top plate 220 toward the lowered position of the top plate. The spring 293 may include, for example, a compression spring 293. A plurality of springs 293, which are disposed symmetrically with respect to the center of the top plate 220, may be provided on the top plate 220 such that the elastic restoring forces provided by the springs 293 act generally uniformly on the entirety of the top plate 220.

The spring 293 prevents the deformation and damage of the top plate 220 and/or the main body lid 200 by absorbing the force acting on the top plate 220 and/or the main body lid 200 when the pressure in the inner pot 310 is in the state of high pressure. Further, the spring 293 can elastically support the top plate 220 and the packing 130 in the direction from the raised position of the top plate 220 toward the lowered position of the top plate. In such a case, the packing 130 disposed between the top plate 220 and the inner pot 310 may be compressed by the elastic restoring force provided by the spring 293. Due to the elastic restoring force provided by the spring 293, even when the pressure in the inner pot 310 is in the state of high pressure, the packing 130 disposed between the inner pot 310 and the top plate 220 can be compressed to an appropriate level.

According to exemplary embodiments of the present invention, the cover assembly 100 is separably fastened to the main body lid 200 of the cooking apparatus 10, and the packing 130 of the cover assembly 100 prevents a vacuum from being formed in the space between the packing 130 and the top plate 220 and in the space between the packing 130 and the inner pot 310. Thus, an excessive external force can be prevented from being applied to the packing 130 in the process of separating the packing 130 from the main body lid 200 and/or the inner pot 310. Therefore, the deformation and wear of the packing 130 is prevented, and the sealing performance of the packing 130 can be improved and, ultimately, the cooking quality of the cooking apparatus 10 can be improved.

As described above, exemplary embodiments have been disclosed in the drawings and specification. Although the embodiments have been described by using specific terms in the present specification, the terms have only been used for the purpose of describing the technical ideas of the present disclosure, and are not intended to limit the meaning of the terms or the scope of the present disclosure defined in the claims. Therefore, a person of ordinary skill in the art will understand that various modifications and equivalents of other embodiments are possible from the embodiments. Therefore, the true technical scope of protection of the present disclosure should be determined based on the technical ideas of the appended claims.

What is claimed is:

1. A cover assembly for a cooking apparatus configured to seal a gap between an inner pot accommodated in a main body of the cooking apparatus and a top plate of a main body lid of the cooking apparatus, the cover assembly comprising:
- a cover plate; and
- a ring-shaped packing coupled to a circumference of the cover plate and extending along the circumference of the cover plate, wherein the packing comprises:
- a central body including a fastening groove into which the cover plate is fitted;
- an upper close contact protrusion extending inward from the central body to be inclined upward and configured to make close contact with the top plate;
- a lower close contact protrusion extending inward from the central body to be inclined downward and configured to make close contact with the inner pot;
- a plurality of upper air grooves provided in an upper surface of the central body and spaced apart from each other along a circumference of the packing;
- a plurality of lower air grooves provided in a lower surface of the central body and spaced apart from each other along the circumference of the packing,
- a plurality of upper auxiliary grooves provided in the upper surface of the central body and provided between two upper air grooves neighboring in a circumferential direction of the packing among the plurality of upper air grooves; and
- a plurality of lower auxiliary grooves provided in the lower surface of the central body and provided between two lower air grooves neighboring in the circumferential direction of the packing among the plurality of lower air grooves, wherein a depth of each of the plurality of upper auxiliary grooves is smaller than a depth of each of the plurality of upper air grooves, and wherein a depth of each of the plurality of lower auxiliary grooves is smaller than a depth of each of the plurality of lower air grooves.

2. The cover assembly of claim 1, wherein the packing further comprises a connection groove extending from one end portion of one of the plurality of upper air grooves up to one end portion of one of the plurality of lower air grooves.

3. The cover assembly of claim 1, wherein the packing has an up-and-down symmetrical structure.

4. The cover assembly of claim 1, further comprising:
- a handle mounted on a central portion of the cover plate,
- wherein the handle includes an insertion groove into which a fixing post of the main body lid is inserted.

* * * * *